United States Patent
Seong

(10) Patent No.: US 7,621,559 B2
(45) Date of Patent: Nov. 24, 2009

(54) PILLAR RAMP STRUCTURE FOR PREVENTING INTERFERENCE WITH CURTAIN AIRBAG

(75) Inventor: Chang Mo Seong, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 130 days.

(21) Appl. No.: 11/529,426

(22) Filed: Sep. 27, 2006

(65) Prior Publication Data
US 2007/0132217 A1 Jun. 14, 2007

(30) Foreign Application Priority Data
Dec. 12, 2005 (KR) ........................ 10-2005-0122006

(51) Int. Cl.
*B60R 21/16* (2006.01)
(52) U.S. Cl. .................................... 280/730.2

(58) Field of Classification Search ............. 280/730.2, 280/728.2
See application file for complete search history.

(56) References Cited

U.S. PATENT DOCUMENTS

| 6,793,241 | B2 * | 9/2004 | Wallner et al. | 280/730.2 |
| 7,182,366 | B2 * | 2/2007 | Enriquez | 280/730.2 |
| 7,481,448 | B2 * | 1/2009 | Heigl et al. | 280/730.2 |

* cited by examiner

*Primary Examiner*—Faye M. Fleming
(74) *Attorney, Agent, or Firm*—Morgan, Lewis & Bockius LLP

(57) ABSTRACT

This invention relates to a pillar ramp structure which prevents interfering with the deployment of a curtain airbag. In one embodiment, the present invention includes a pillar ramp housing which is fixed to an inner panel, and a folding bracket in which the first end of the folding bracket is installed to a front surface of the pillar ramp housing and the second end of the folding bracket extends toward a pillar trim.

13 Claims, 5 Drawing Sheets

PILLAR RAMP STRUCTURE FOR PREVENTING INTERFERENCE WITH CURTAIN AIRBAG

CROSS-REFERENCE TO RELATED APPLICATION

This application claims priority to Korean Patent Application No. 10-2005-0122006 filed in the Korean Intellectual Property Office on Dec. 12, 2005, the disclosures of which are incorporated herein by reference.

BACKGROUND OF THE INVENTION (a) Field of the Invention

The present invention relates to a pillar ramp structure which prevents a pillar trim from interfering with the deployment of a curtain airbag.

(b) Description of the Related Art

In general, there has been a growing interest in the safety of passengers when riding a vehicle. In particular, safety devices which protect passengers in a vehicle accident have become gradually important over the years.

Among all such safety devices, airbag systems serve to protect passengers from being injured in a head-on vehicle collision or a broadside vehicle collision. There are typically two types or airbag systems: a curtain airbag and a side airbag. The curtain airbag generally protects the heads of passengers, while the side airbag generally protects the sides of passengers.

The curtain airbag is generally installed along the upper end along the door of the passenger side, and is configured to be deployed during a vehicle collision. Particularly, the curtain airbag is effective in an overturned vehicle as well as a broadside collision, thereby providing safety to passengers.

SUMMARY OF THE INVENTION

The present invention relates to a pillar ramp structure which prevents interfering with the deployment a curtain airbag.

An exemplary embodiment of the present invention provides a pillar ramp structure from interfering with a curtain airbag by including a pillar ramp housing fixed to an inner panel, and a folding bracket in which a first end of the folding bracket is installed to a front surface of the pillar ramp housing and the second end of the folding bracket is extended toward a pillar trim.

The pillar ramp housing may be bent in a plurality of locations as to form a perforated rectangular structure. The pillar ramp housing may include a plate member comprising a hook member which is connected to the first end of the folding bracket and a connecting member that is provided below the plate member and is formed such that the folding bracket can be installed thereto.

The pillar ramp housing, the folding bracket, and the fixing member may be integrally formed with a hard material. Alternatively, the plate member of the pillar ramp housing and the folding bracket may be made of hard material such as PPF (Thermo Plastic Olefin) while the folding bracket and the fixing member may be made of soft material such as TPO (Polypropylene Filled) by double injection molding.

A rotating axis is connected to a connection member and the connection member is connected to the folding bracket.

A plurality of projections protrudes in an outward direction from both sides of a front surface of the first end of the folding bracket. Insertion grooves may be formed on both sides of a front surface of the second end of the folding bracket at positions thereby corresponding to the positions of the projections.

A mounting hole which is coupled to the pillar trim is formed on the front surface of the first end of the folding bracket.

DETAILED DESCRIPTION OF THE EMBODIMENTS

In order to prevent a curtain airbag from being caught by a pillar trim during deployment, a ramp bracket of a curtain airbag is installed at a position where a pillar trim and a head lining are connected to each other.

However, a vehicle body structure can be deformed by collision energy generated in a vehicle collision thereby damaging the pillar trim which in turn causes the curtain airbag not to deploy.

In order to solve this problem, technologies for preventing the pillar trim from interfering with the curtain airbag during deployment of the curtain airbag is accomplished by changing the structure of a ramp bracket.

An exemplary embodiment of the present invention will hereinafter be described in detail with reference to the accompanying drawings.

Figure 1:
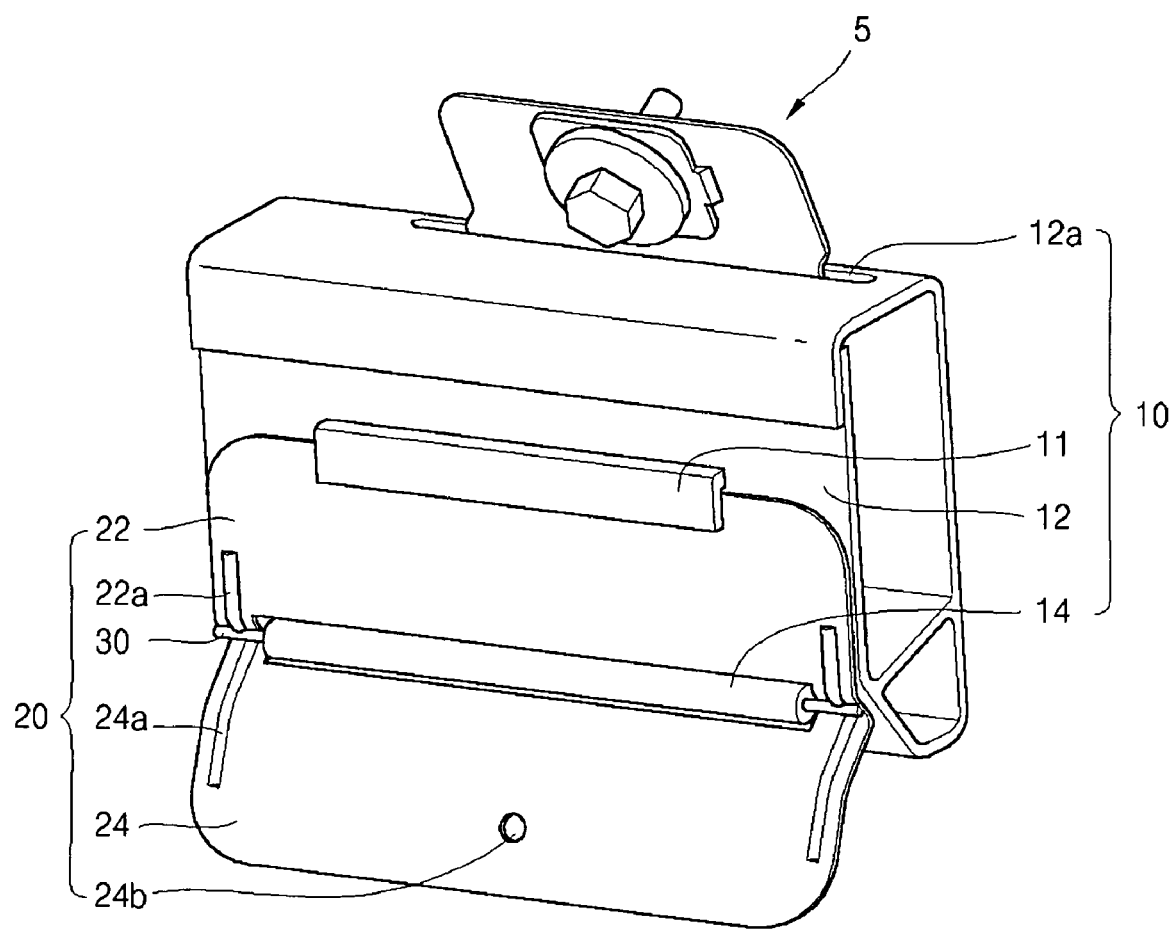
FIG. 1 is a pillar ramp structure which prevents interference with a curtain airbag.
Figure 2:
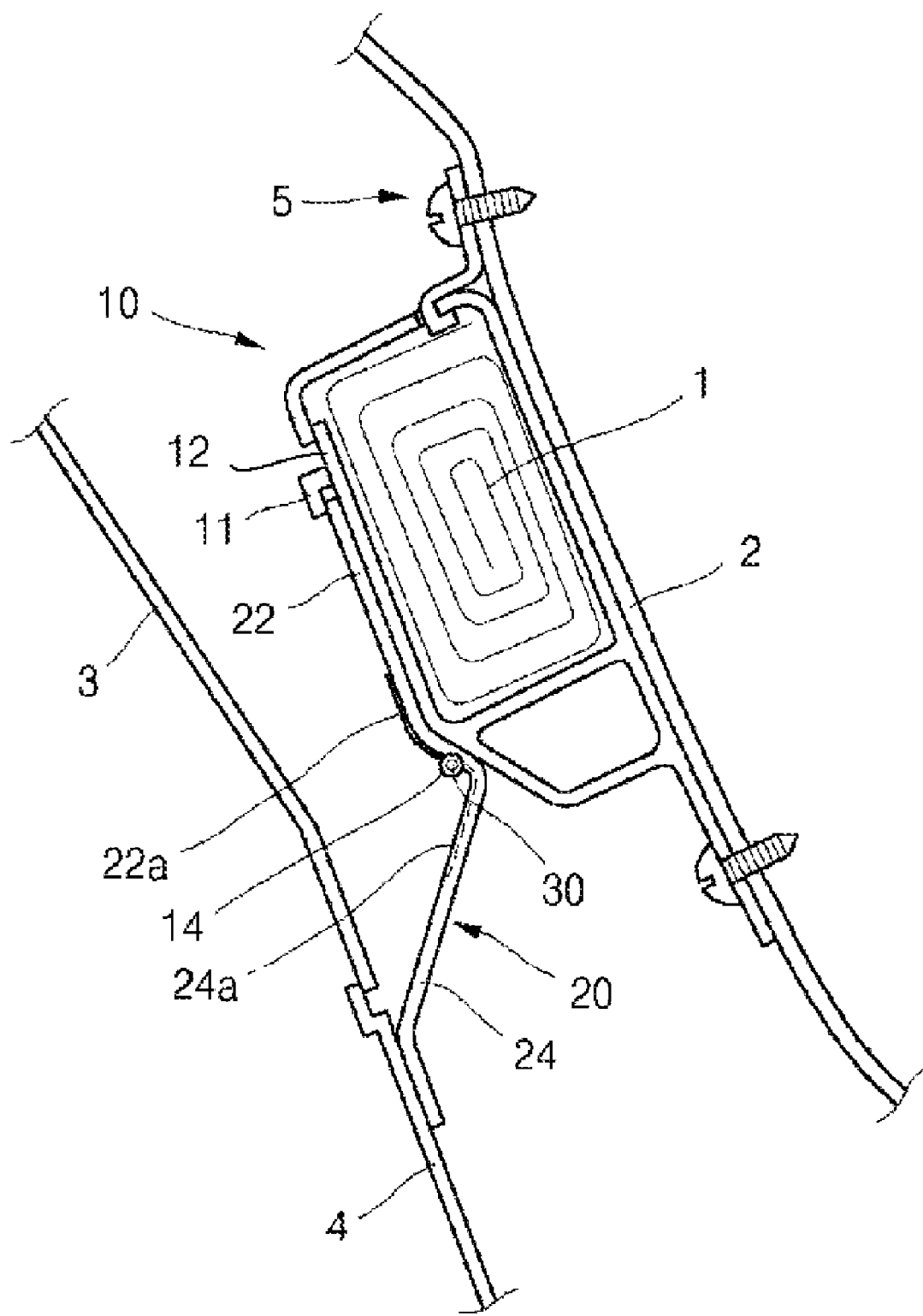
FIG. 2 is a cross-sectional view taken along a line A-A in FIG. 1.

Referring to FIG. 1 and FIG. 2, a pillar ramp housing 10 is fixed to an inner panel 2. A pillar ramp structure for preventing interference with a curtain airbag includes a folding bracket 20 including a first folding member 22 installed on a front surface of the pillar ramp housing 10 and a second folding member 24 integrally formed with the first folding member 22 and extends toward a pillar trim 4. The front surface of the pillar ramp housing 10 may be a cover which is opened upon activation of the curtain airbag so that the curtain airbag may expand therethrough. Further, the cover may be a plate member 12 having a hook member 11 which is connected to the first folding member 22.

The pillar ramp housing 10 is bent in a plurality of locations as to form a perforated rectangular structure.

In addition, the pillar ramp housing 10 includes a connecting member 14 that is provided below the plate member 12 and is formed such that the folding bracket 20 can be installed thereto.

A slot groove 12a is formed on an upper surface of the pillar ramp housing 10 such that a fixing member 5 which is coupled to the inner panel 2 can be connected thereto, and the slot groove 12a is formed in a longitudinal direction of the pillar ramp housing 10.

The fixing member 5 may include a separate fixing bracket installed in the slot groove 12a and a bolt and a washer coupled to the fixing bracket and mounted to the inner panel 2.

The pillar ramp housing 10, the folding bracket 20, and the fixing member 5 may be integrally formed of hard material. Alternatively, the plate member 12 of the pillar ramp housing 10 and the second folding member 24 may be formed of hard material such as PPF (Thermo Plastic Olefin) while the first folding member 22 and the fixing member 5 may be formed of soft material such as TPO (Polypropylene Filled) by double injection molding.

The first folding member 22 of the folding bracket 20 is formed to have a shape being able to closely adhere to a front surface of the pillar ramp housing 10, and projections 22a outwardly protrude from both sides of a front surface of the first folding member 22.

The folding bracket 20 has a rotating axis 30 between the first folding member 22 and the second folding member 24. The rotating axis 30 is coupled to the connecting member 14 of the pillar ramp housing 10.

Insertion grooves 24a are formed on both sides of a front surface of the second folding member 24 at positions corresponding to the projections 22a.

A mounting hole 24b that is coupled with a pillar trim is formed in a front surface of in the second folding member 24. The second folding member 24 is fixed to the pillar trim by a bolt inserted into the mounting hole 24b.

Operating states of the pillar ramp structure prevent interference with a curtain airbag according to an embodiment of the present invention.

Figure 3A:
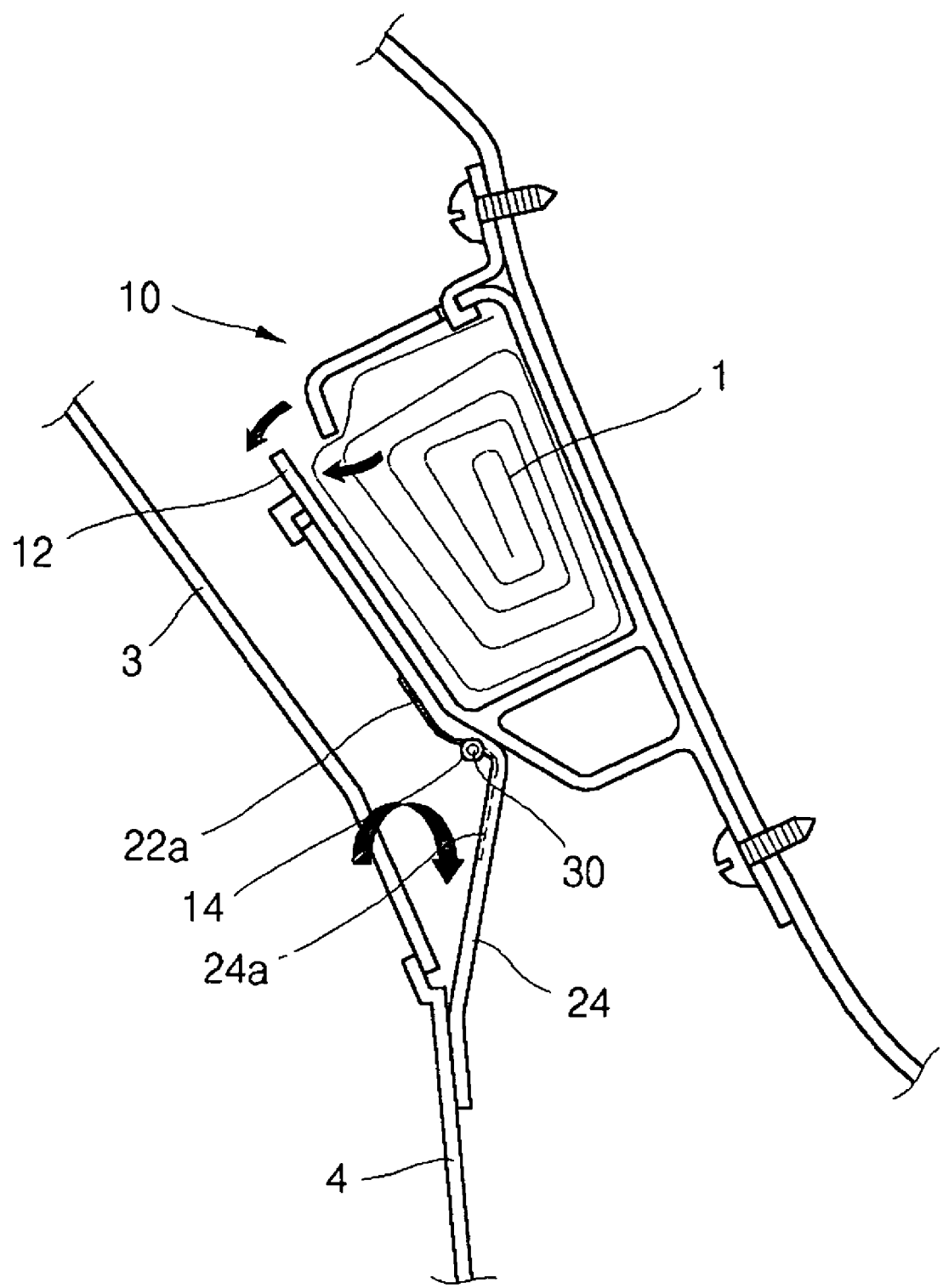
FIG. 3a to FIG. 3c are operating states of the pillar ramp structure which prevents interference with a curtain airbag.

Referring to FIG. 3a, when a vehicle is turned over or suffers a broadside collision, a curtain airbag 1 starts to be inflated.

By the inflation force of the curtain airbag 1, the plate member 12 of the pillar ramp housing 10 rotates in a direction of a solid arrow shown in FIG. 3a.

At the same time, the second folding member 24 moves in an outward direction as shown in the drawing, thereby causing the pillar trim 4 which is already fixed to the second folding member 24 to move.

Figure 3B:
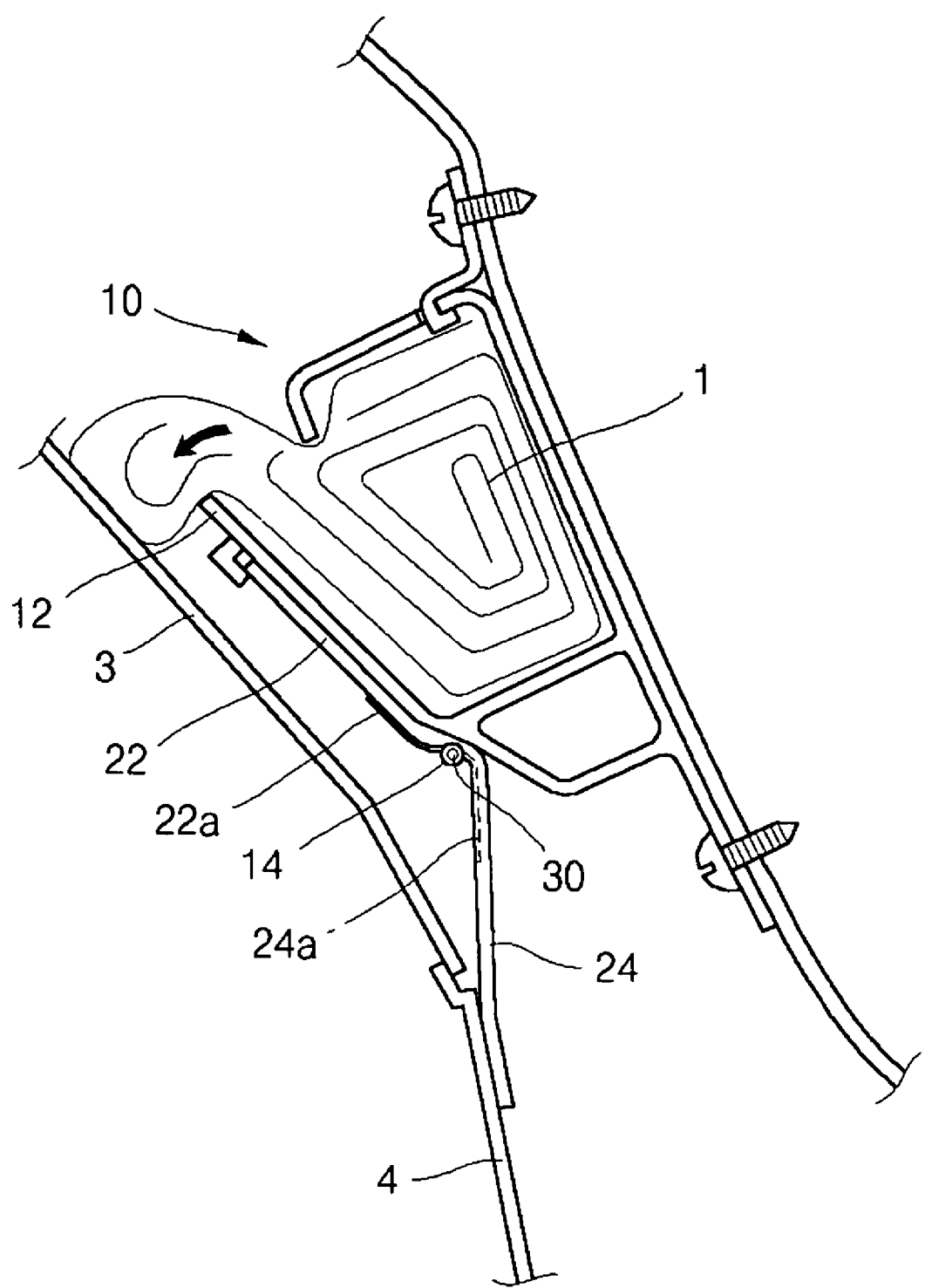

Referring to FIG. 3b, if the plate member 12 further rotates toward a head lining 3, the first folding member 22 connected to the hook member 11 of the plate member 12 moves together with the plate member 12.

Since the rotating axis 30 installed to the connecting member 14 provided to the pillar ramp housing 10 is provided between the first folding member 22 and the second folding member 24, the first folding member 22 rotates in response to the plate member 12.

At the same time, the second folding member 24 moves in an outward direction, and the pillar trim 4 which is already fixed to the second folding member 24 moves together.

Figure 3C:
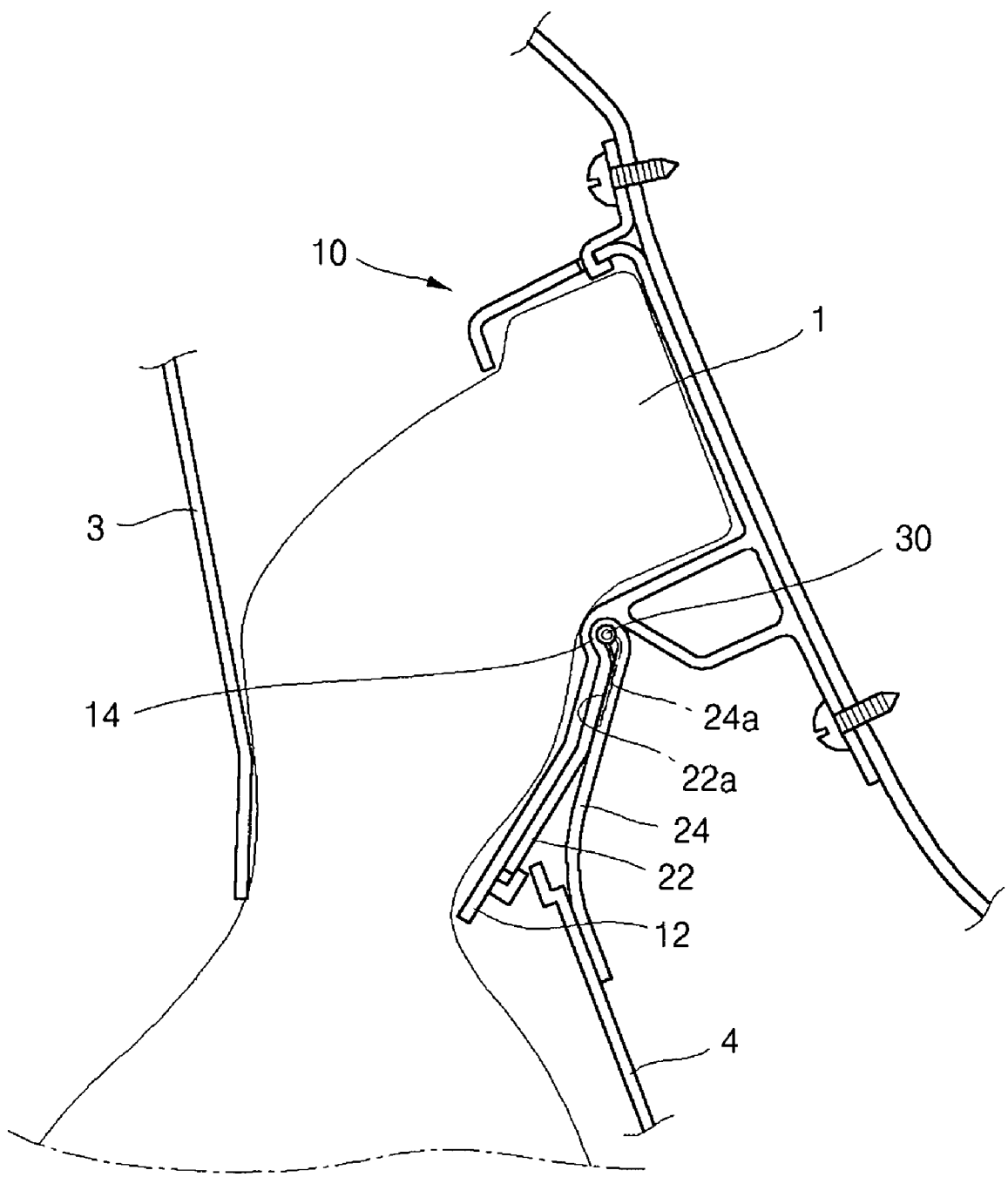

Referring to FIG. 3c, if the curtain airbag 1 is further deployed from the state of FIG. 3b, the inflation force of the curtain airbag 1 acts on the head lining 3 which is connected to an end portion of the pillar trim 4.

Accordingly, the head lining 3 is separated from the end portion of the pillar trim 4 and moves toward the interior of the vehicle, and thereby smoothly deploying curtain airbag 1.

During the above-mentioned operations, the first folding member 22 operates together with plate member 12 which rotates toward the interior of a vehicle. The second folding member 24 moves in an outer direction of a vehicle thereby pulling the pillar trim 4 in an outer direction of a vehicle.

At the same time, the projections 22a formed on the first folding member 22 are respectively inserted into the insertion grooves 24a of the second folding member 24, such that the first folding member 22 stably rotates thereby allowing curtain airbag 1 to deploy normally.

The pillar ramp housing 10, the folding bracket 20, and the fixing member 5 can be integrally formed of hard material such that the curtain airbag 1 can be easily deployed. Alternatively, the plate member 12 of the pillar ramp housing 10 and the second folding member 24, which operates in response to the deployment of the curtain airbag 1, can be made of hard material while the first folding member 22 and the fixing member 5 can be made of soft material by double injection molding.

Since the second folding member 24 is fixed to the pillar trim 4 by inserting a separate bolt into the mounting hole 24b, the folding bracket 20 can operate smoothly during the operation of the first folding member 22.

As described above, the pillar ramp structure has the advantage that the curtain airbag is not interfered by the pillar trim during deployment of the curtain airbag.

In addition, the pillar ramp structure prevents the pillar trim from moving in an inner direction of a vehicle when the vehicle is involved in a collision.

While this invention has been described in connection with what is presently considered to be practical exemplary embodiments, it is to be understood that the invention is not limited to the disclosed embodiments, but on the contrary, the invention is intended to cover various modifications and equivalent arrangements included within the spirit and scope of the appended claims.

What is claimed is:

1. A pillar ramp structure for preventing interference with deployment of a curtain airbag, comprising:
   a pillar ramp housing connected to an inner panel and having a cover which is opened upon activation of the curtain airbag so that the curtain airbag expand therethrough, wherein the curtain airbag is received in the pillar ramp housing; and
   a folding bracket in which a first end of the folding bracket is installed to the cover of the pillar ramp housing and a second end of the folding bracket extends toward a pillar trim;
   wherein the pillar ramp housing is bent in a plurality of locations to form a perforated rectangular structure.

2. A pillar ramp structure for preventing interference with deployment of a curtain airbag, comprising:
   a pillar ramp housing connected to an inner panel and having a cover which is opened upon activation of the curtain airbag so that the curtain airbag expand therethrough, wherein the curtain airbag is received in the pillar ramp housing; and
   a folding bracket in which a first end of the folding bracket is installed to the cover of the pillar ramp housing and a second end of the folding bracket extends toward a pillar trim;
   wherein the cover is a plate member having a hook member connected to the first end of the folding bracket and wherein the pillar housing includes a connecting member that is provided below the plate member and is formed such that the folding bracket can be installed thereto.

3. The pillar ramp structure of claim 2, wherein a slot groove is formed on an upper surface of the pillar ramp housing such that a fixing member for being coupled to the inner panel can be connected to the slot groove.

4. The pillar ramp structure of claim 3, wherein the pillar ramp housing, the folding bracket, and the fixing member are integrally formed.

5. The pillar ramp structure of claim 4, wherein the folding bracket is made of a hard material.

6. A pillar ramp structure for preventing interference with deployment of a curtain airbag, comprising:
   a pillar ramp housing connected to an inner panel and having a cover which is opened upon activation of the curtain airbag so that the curtain airbag expand therethrough, wherein the curtain airbag is received in the pillar ramp housing; and a folding bracket in which a first end of the folding bracket is installed to the cover of the pillar ramp housing and a second end of the folding bracket extends toward a pillar trim;

wherein the folding bracket is shaped such that the folding bracket closely adheres to the cover of the pillar ramp housing.

7. A pillar ramp structure for preventing interference with deployment of a curtain airbag, comprising:

a pillar ramp housing connected to an inner panel and having a cover which is opened upon activation of the curtain airbag so that the curtain airbag expand therethrough, wherein the curtain airbag is received in the pillar ramp housing; and a folding bracket in which a first end of the folding bracket is installed to the cover of the pillar ramp housing and a second end of the folding bracket extends toward a pillar trim;

wherein the folding bracket has a rotating axis which is connected to a connecting member arranged on the pillar ramp housing is connected to a connection member and the connection member is connected to the folding bracket.

8. The pillar ramp structure of claim 2, wherein the folding bracket has a rotating axis which is connected to the connecting member of the pillar ramp housing.

9. A pillar ramp structure for preventing interference with deployment of a curtain airbag, comprising:

a pillar ramp housing connected to an inner panel and having a cover which is opened upon activation of the curtain airbag so that the curtain airbag expand therethrough, wherein the curtain airbag is received in the pillar ramp housing; and a folding bracket in which a first end of the folding bracket is installed to the cover of the pillar ramp housing and a second end of the folding bracket extends toward a pillar trim;

wherein a plurality of projections protrude from both sides of the front surface of the first end of the folding bracket.

10. The pillar ramp structure of claim 9, wherein a plurality of insertion grooves are formed on both sides of the front surface of the second end of the folding bracket at positions corresponding to the positions of the plurality of projections.

11. A pillar ramp structure for preventing interference with deployment of a curtain airbag, comprising:

a pillar ramp housing connected to an inner panel and having a cover which is opened upon activation of the curtain airbag so that the curtain airbag expand therethrough, wherein the curtain airbag is received in the pillar ramp housing; and a folding bracket in which a first end of the folding bracket is installed to the cover of the pillar ramp housing and a second end of the folding bracket extends toward a pillar trim;

wherein a mounting hole that is coupled with the pillar trim is formed on the first end of the folding bracket.

12. A pillar ramp structure for preventing interference with deployment of a curtain airbag, comprising:

a pillar ramp housing connected to an inner panel and having a cover which is opened upon activation of the curtain airbag so that the curtain airbag expand therethrough; and a folding bracket in which a first end of the folding bracket is installed to the cover of the pillar ramp housing and a second end of the folding bracket extends toward a pillar trim coupled to a head lining and is coupled thereto, wherein the pillar trim is configured to be disengaged from the head lining upon the activation of the curtain airbag;

wherein the first and second ends of the folding bracket are co-axially pivotal with a rotation axis.

13. The pillar ramp structure of claim 12, wherein the rotation axis of the first and second ends of the folding bracket are disposed on end portion of the cover.

* * * * *